United States Patent [19]

Tausch

[11] 4,033,677
[45] July 5, 1977

[54] PERISCOPE BLACKOUT BLIND CONSTRUCTION

[75] Inventor: Gerald Tausch, Salem, Ohio

[73] Assignee: Miller-Holzwarth, Inc., Salem, Ohio

[22] Filed: May 6, 1976

[21] Appl. No.: 683,741

[52] U.S. Cl. .................................. 350/301; 350/65
[51] Int. Cl.² ......................................... G02B 5/08
[58] Field of Search ............. 350/65, 52, 301, 302, 350/266, 315, 321, 61; 250/519

[56] References Cited
UNITED STATES PATENTS 2,130,006  9/1938  Gundlach .......................... 350/302

*Primary Examiner*—John K. Corbin
*Assistant Examiner*—Jon W. Henry
*Attorney, Agent, or Firm*—Frease & Bishop

[57] ABSTRACT

A blackout blind is movably mounted within a periscope of an armor vehicle for covering the eyepiece viewing opening when not in use to prevent interior light from being emitted through the periscope and revealing the location of the vehicle. A transparent block of plastic is mounted within a protective housing which extends through an opening in the vehicle armor. A viewing opening is formed in the housing portion located within the vehicle for observing an exterior field of view. A sheet metal guide is mounted within the housing between the plastic block and housing walls and is formed with a pair of channels which extend along the edges of the viewing opening. A blackout blind is slidably mounted and retained within the channels and between the block and housing walls, and is movable across the viewing opening of the housing between open and closed positions. The blind preferably is formed of a polycarbonate sheet material which enables the blind to move through severe radius sizes when concealed within the housing without cracking, sticking or taking a set under severe weather and operating conditions.

12 Claims, 11 Drawing Figures

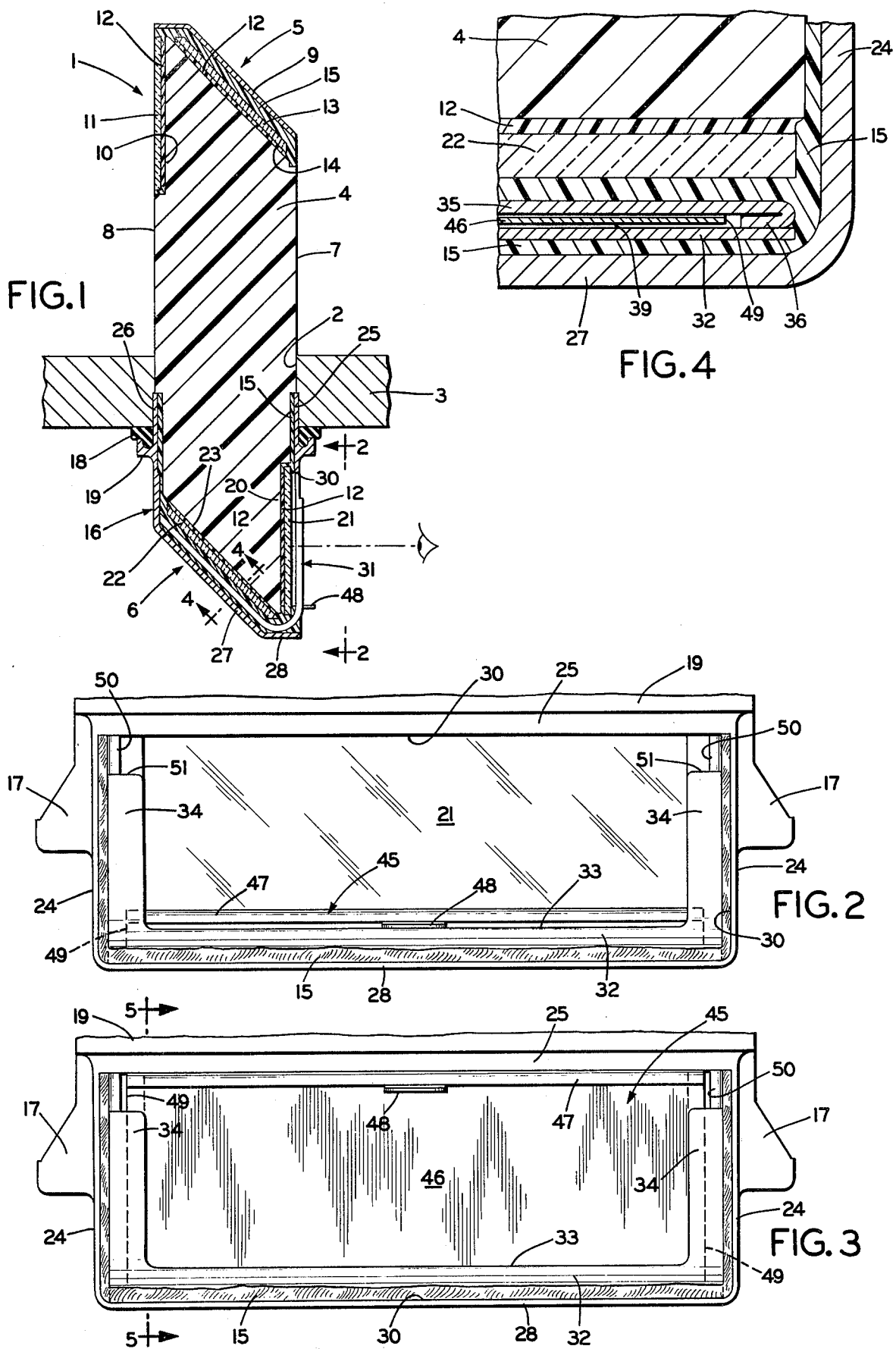

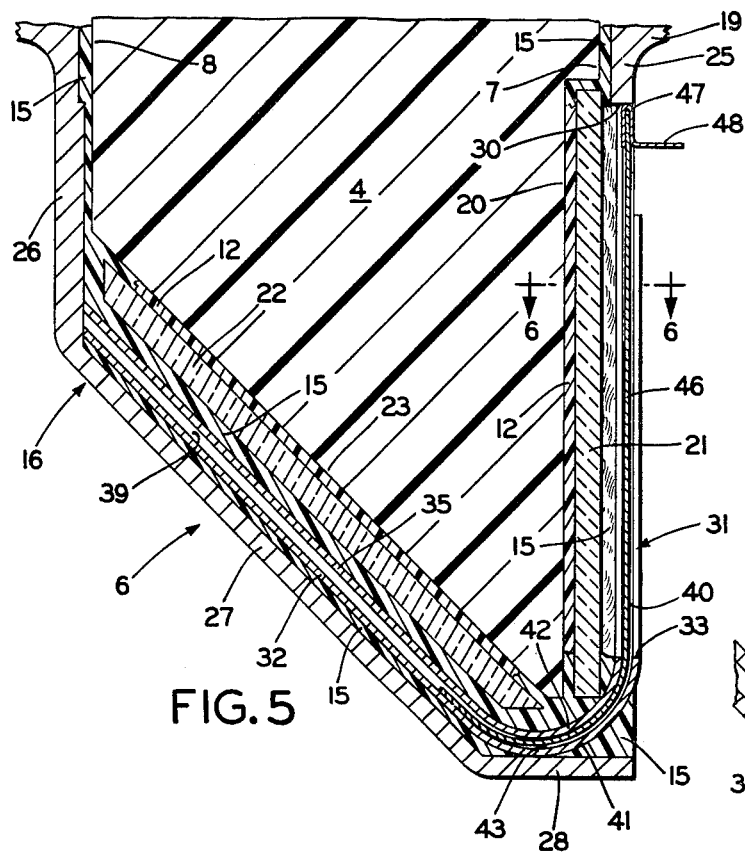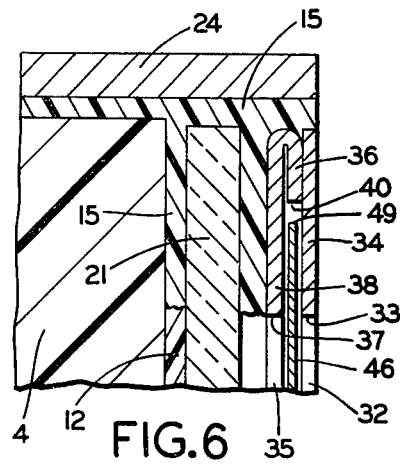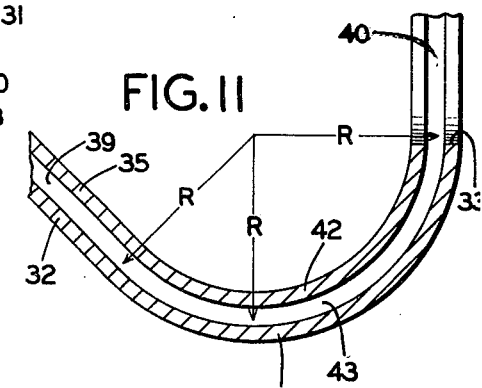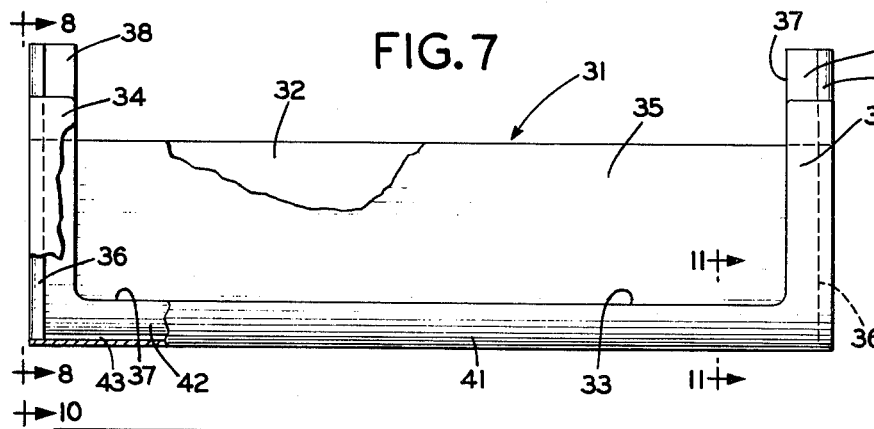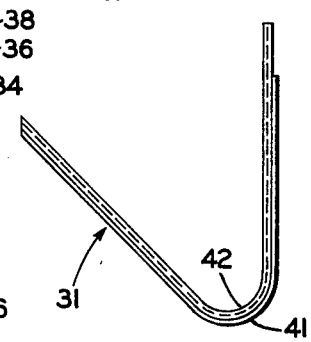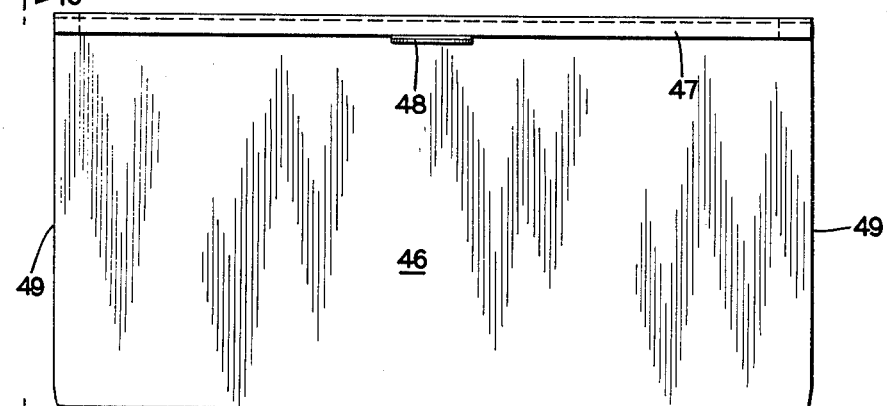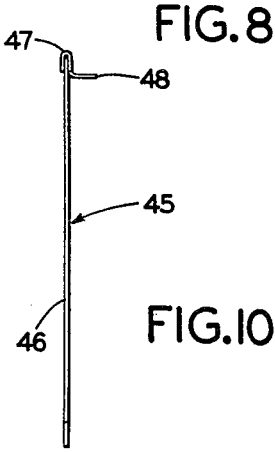

PERISCOPE BLACKOUT BLIND CONSTRUCTION

BACKGROUND OF THE INVENTION

1. Field of the Invention

The invention relates to periscopes for observing a field of view from within a protected structure and particularly to a periscope for armored vehicles. More particularly, the invention relates to a blackout blind mounted within the periscope for covering and exposing the eyepiece viewing opening to prevent light from being emitted from within the vehicle when the periscope is not in use.

2. Description of the Prior Art

Numerous periscope constructions have been developed and are in use for armored vehicles such as tanks. These periscopes contain various optical systems which enable the occupants to observe a field of view exterior of the vehicle without providing a direct opening through the armor for passage of projectiles, chemicals, liquids or other harmful materials. Many periscope constructions presently used on tanks, consist of a plastic block mounted within a protective housing which extends through an opening in the tank. The observer views an exterior field of view through a window opening in an end portion of the block. These periscopes permit light to pass from the interior to the exterior of a tank as well as in the reverse direction, when viewing an object in the field of view. This presents a serious problem in that such an internal light when emitted can be observed by an enemy and reveal the position of the tank. Modern light detection equipment in use by the military, is able to detect even small amounts of light in order to pinpoint an enemy's location. This problem requires eliminating or greatly reducing the amount of light possible within a tank, which light is necessary in many situations for map reading, etc., as well as for the general comfort and convenience of the crew.

Various shade and shutter constructions have been devised in an attempt to eliminate this problem. Makeshift flaps have been mounted above or adjacent the periscope viewing opening which are flipped up or down to cover the opening when not in use. These devices occupy critical space within the tank and are easily broken or damaged due to the severe shocks that the tank experiences. Also complete sealing and blackout is not always achieved.

Problems arose in attempting to mount a blackout blind within the interior of a periscope in that only a very small amount of space exists between the transparent periscope block and its protective housing. This limited space results in severe radii of curvature through which any such concealed blind must move when opening and closing the viewing window. The material required for the blind must be opaque and provide sufficient flexibility to move through such radii under operating conditions as low as −65° F, and heat well in excess of 165° F without becoming brittle or weak. Likewise, the blind material should be self-lubricating such as plastic to eliminate the need of any external lubrication. However, the blind must not crack or take a permanent set when kept in a bent position of the severe radii in such extremely cold temperatures, as do many types of plastics. It also is desirable that such a blackout blind construction be able to be incorporated within existing periscope designs and constructions without major modifications.

No periscope construction of which I am aware eliminates these problems in a simple, effective and inexpensive manner by the use of a polycarbonate sheet movably mounted on a guide track within the periscope between the housing and transparent plastic block.

SUMMARY OF THE INVENTION

Objectives of the invention include providing a periscope construction for an armor vehicle having a blackout blind contained within the periscope housing and movable across the eyepiece viewing window to prevent interior light from being emitted from within the tank when the periscope is not in use; providing such a periscope construction in which a simple sheet metal guide forms a pair of spaced channels which is mounted between the housing and transparent block of the periscope, and which eliminates any modifications to many existing periscope constructions; providing such a periscope construction having a blackout blind formed of a polycarbonate sheet which has sufficient flexibility to move about severe bends within the housing, which resists the taking of a permanent set when kept in such a severe bent position in extremely cold temperatures, which does not become excessively flexible upon experiencing high temperatures, and which is self-lubricating eliminating any external lubricant for its operation; providing such a periscope construction in which the blind can be removed easily from within the housing should it become damaged, without disassembling or removing the housing or periscope from its mounting on the vehicle; and providing such a periscope blackout blind construction which is of an extremely simple, rugged, efficient and inexpensive construction, which eliminates difficulties, and solves problems and satisfies needs which have long existed in the art.

These objectives and advantages are obtained by the improved periscope construction, the general nature of which may be stated as including a transparent block having eyepiece and object viewing sections located at generally opposite ends of the block with the eyepiece section having a viewing surface and a reflective surface forming an included acute angle therebetween; a protective housing enclosing portions of the eyepiece viewing section, with the housing having an opening aligned with the viewing surface and an angled rear wall spaced from and extending generally parallel with the reflective surface; guide means mounted between the housing and the transparent block, the guide means having a pair of spaced parallel channels with a first straight leg portion extending along edges of the housing opening, a second straight leg portion extending between the housing rear wall and the reflective surface of the block, and a curved portion integrally connecting said first and second straight leg portions and extending about the exterior of the angle formed by the viewing and reflective surfaces of the block; and flexible opaque sheet means formed of polycarbonate slidably mounted on and extending between the spaced channels, the sheet means being movable in the first straight leg portion across the housing opening between open and closed positions for exposing and covering the eyepiece viewing surface of the transparent block, and movable through the curved channel portion between the first and second straight leg portions.

BRIEF DESCRIPTION OF THE DRAWINGS

A preferred embodiment of the invention — illustrative of the best mode in which applicant has contemplated applying the principle — is set forth in the following description and shown in the accompanying drawings, and is particularly and distinctly pointed out and set forth in the appended claims.

FIG. 1 is a vertical sectional view of the improved periscope construction mounted on a portion of a vehicle, with the blackout blind shown in open position;

FIG. 2 is an enlarged fragmentary front elevation looking in the direction of arrows 2—2, FIG. 1, of the eyepiece viewing window with the blackout blind in open position;

FIG. 3 is a view similar to FIG. 2 showing the blackout blind in closed position;

FIG. 4 is a greatly enlarged fragmentary sectional view taken on line 4—4, FIG. 1;

FIG. 5 is an enlarged fragmentary sectional view taken on line 5—5, FIG. 3;

FIG. 6 is a greatly enlarged fragmentary sectional view taken on line 6—6, FIG. 5;

FIG. 7 is a front elevational view of the blackout blind guide track removed from the periscope;

FIG. 8 is an end elevation of the guide track looking in the direction of arrows 8—8, FIG. 7;

FIG. 9 is a plan view of the blackout blind removed from the periscope and guide track;

FIG. 10 is an end elevation of the blackout blind looking in the direction of arrows 10—10, FIG. 9; and FIG. 11 is a greatly enlarged fragmentary sectional view taken on line 11—11, FIG. 7.

Similar numerals refer to similar parts throughout the drawings.

DESCRIPTION OF THE PREFERRED EMBODIMENT

The improved periscope construction is indicated generally at 1, and is shown in vertical section in FIG. 1 mounted within an opening 2 of an armor plate 3. Periscope 1 includes a main transparent body 4 formed of a clear plastic material of optical quality such as methyl methacrylate. Body 4 has an upper object viewing section and a lower eyepiece viewing section, indicated generally at 5 and 6, respectively. Body 4 preferably has a generally rectangular shape formed with opposed parallel front and rear planar surfaces 7 and 8 and a pair of opposed parallel planar end surfaces.

Object viewing section 5 is contained within a protective housing cover 9 and has a recessed object viewing surface 10 with a clear window 11 being mounted thereon by a clear optical adhesive 12. A reflective mirror 13 is mounted on an angled top planar surface 14 of body 4 by a sealing adhesive 15.

Eyepiece viewing section 6 is contained within a protective housing cover, indicated generally at 16, which is secured to armor plate 3 by a pair of end mounting lugs 17 (FIGS. 2 and 3). A rectangular rubber sealing gasket 18 is mounted between armor plate 3 and a gasket mounting flange 19 formed on housing 16 (FIG. 1) for effectively sealing armor plate opening 2.

Eyepiece viewing section 6 (FIG. 5) includes a recessed vertically extending planar viewing surface 20 formed in surface 7, with a clear window glass 21 being mounted thereon by optical adhesive 12 in a similar manner as window glass 11 of object viewing section 5. A second reflective mirror 22 is mounted on angled bottom surface 23 of body 4 by adhesive 12. Housing cover 16 includes spaced end walls 24 (FIG. 2) on which mounting lugs 17 are mounted and spaced vertically extending front and rear walls 25 and 26 respectively. Walls 25 and 26 are parallel with and secured to front and rear surfaces 7 and 8 of body 4 by a sealing adhesive 15. Rear wall 26 includes an angled end wall section 27 which extends parallel with angled bottom surface 23 and reflective mirror 22 of body 4 and is spaced therefrom. Wall 27 terminates in a horizontally extending bottom flange 28. The edges of end walls 24 and bottom flange 28, together with front wall 25 define a window opening 30 (FIGS. 2 and 3) which aligns with eyepiece viewing glass 21 and viewing surface 20 of viewing section 6.

The components described above are illustrative of one type of known periscope construction in which the improved blackout blind may be mounted with the various surfaces and components being referred to as front, back, vertical, horizontal, etc., in accordance with their position as shown in the drawings. These directional descriptions are not limiting features thereof since the periscope may be mounted in various positions and angles on the vehicle body and are indicated as such for clarity and understanding.

In accordance with the invention, a guide track indicated generally at 31 (FIGS. 7 and 8) is mounted within housing 16 adjacent eyepiece viewing section 6. Guide track 31 is formed of sheet metal and includes outer and inner curved sheets 32 and 35, respectively. Outer sheet 32 is formed with rectangular cutout front portion 33 (FIG. 7), which forms a pair of parallel spaced side strips 34. Inner sheet 35 has reversely bent flange edges 36 (FIGS. 6 and 7) and is formed with a rectangular cutout 37. Cutout 37 aligns with cutout 33 of outer sheet 32 and forms a pair of spaced parallel side strips 38 similar to and slightly longer than strips 34.

Outer sheet 32 is in juxtaposition with inner curved sheet 35 and is spaced therefrom by flange edges 36. Spaced sheets 32 and 35 form a rectangular shaped space 39 therebetween which aligns with and is located between angled housing end wall 27 and reflective mirror 22 (FIG. 5). Flange edges 36 space outer strips 34 from inner strips 38 (FIG. 6) and form a pair of parallel spaced channels 40 which extend along the edges of rectangular cutouts 33 and 37. When guide track 31 is mounted within housing 16, cutouts 33 and 37 align with eyepiece viewing surface 20 and housing window opening 30. Guide track 31 is mounted within housing 16 by sealing adhesive 15 inserted between mirror 22 and rear housing walls 26 and 27.

Thus, guide track 31 inlcudes a curved somewhat U-shaped guide channel (FIGS. 5 and 11) consisting of a vertical, first straight leg portion formed by spaced channels 40, an angled, second straight leg portion formed by rectangular space 39 between outer and inner curved sheets 32 and 35, and a curved channel portion 43 formed by curved sections 41 and 42 of outer and inner sheets 32 and 35.

In further accordance with the invention, a blackout blind, indicated generally at 45 (FIGS. 9 and 10), is slidably mounted within guide track 31 for movement between open position (FIGS. 1 and 2) and closed position (FIGS. 3 and 5) for exposing and covering viewing surface 20 of eyepiece viewing section 6 of block 4. Blackout blind 45 includes a rectangular flexible sheet of material 46 having a U-shaped metal reinforcing flange 47 mounted on one edge thereof with an outwardly projecting finger tab 48.

It has been found that formation of sheet 46 of a polycarbonate material provides the desired characteristics for most efficient operation of improved periscope construction 1. Sheet 46 preferably is a polycarbonate film having a range of thicknesses, the amount of which depends upon the severity of the radius of curved guide track portion 43 through which sheet 46 passes in moving between open and closed positions. Sheet 46 preferably is of the type of material sold by General Electric Company under the trademark Lexan, or by the Rohm and Haas Company under the trademark Tuffak. This particular polycarbonate sheet material has been found to provide the flexibility and strength required throughout the range of temperatures to which blind 45 will be subjected. Blind 45 must be able to withstand extremely cold temperatures of −65° F or lower to temperatures in excess of 165° F without cracking or taking a permanent set when kept in a severely bent position in such cold temperatures as does various types of plastic sheeting, and without serious loss of strength in extreme heat. This material also is self-lubricating, as is plastic, eliminating the need for any external lubricant.

Blind 45 is slidably mounted in guide track 31 with the side edges 49 being located within spaced guide channels 40 when in closed position, as shown in FIG. 5, in curved channel portion 43 and in channel space 39. Reinforced sheet metal edge 47 of blind 45, when in closed position (FIG. 3) aligns with spaces 50 formed between the top edges 51 of outer curved sheet strips 34 and the edge of housing front wall 35. Spaces 50 permit blind 45 to be removed easily from its containment within guide track 31 and replaced should it become damaged, without any disassembling being required on housing 16. Sheet 46 is dyed during its manufacture to provide the required opaqueness.

Eyepiece viewing window glass 21 and mirror 22, which are mounted on surfaces 20 and 23, respectively, of eyepiece viewing section 6 (FIG. 5), form an acute included angle therebetween. Curved channel portion 43 of guide track 31 must curve about this angle in connecting vertical straight channel section 40 with angled straight channel section 39. The radius of curved channel portion 43 in most periscope designs is severe due to the extremely confined and limited space between housing walls 27 and 28 and body 4. The range of the radii of curved channel portion 43, indicated at R (FIG. 11) will vary generally between ¼ inch and 1 ½ inches for most periscope constructions in which blackout blind 45 will be incorporated. It is this severe radius of curvature of channel portion 43 around which sheet 46 must pass when blind 45 moves between opened and closed positions which presents a serious problem to the type of material of sheet 46. The polycarbonate sheets described above have been found to be most efficient and satisfactory for these perimeters. As an example, a polycarbonate sheet having a thickness of 0.015 inches has been found to be most efficient for a channel radius of 9/16 inches. Correspondingly, the larger the radius of channel portion 43, greater may be the thickness of sheet 46. The inside surfaces of the channels may be coated with a friction reducing material such as Teflon to reduce the sliding friction existing between these surfaces and reinforcing strip 47 and sheet 46.

Blind 45 is operated easily by an individual within the vehicle by pulling downwardly on finger tab 48 to move blind 45 from the closed position of FIGS. 3 and 5 to the open position of FIGS. 1 and 2. Sheet 46 slides along channels 40, 43 and 39 and is concealed within housing cover 16. There are no projections except for finger tab 48 which extends into the interior of the vehicle to occupy space and which are subject to breakage as in prior constructions. Tab 48 merely is pulled upwardly to the position of FIG. 5 to cover viewing surface 20 and glass 21, preventing the emitting of light therethrough which could be visible by an enemy.

Accordingly, the improved periscope construction contains a blackout blind slidably mounted within the protective metal housing of the periscope and slidably movable between open and close positions; provides a construction in which the blind is formed of a polycarbonate sheet of material able to withstand a wide range of temperatures without cracking or taking a permanent set when maintained in an extremely bent position for long periods of time, and which has self-lubricating properties; provides such a construction in which the blackout blind is slidably mounted within an inexpensive and rugged sheet metal guide track which is mounted between the protective housing and transparent plastic block of the periscope by a sealing adhesive eliminating any expensive and complicated attachment components; provides such a construction in which the blind can be removed easily and rapidly from its sliding track for replacement without any disassembling of the periscope, and in which no components project into the interior of the vehicle to occupy space and become damaged; and provides such a structure which is of extremely simple, rugged and inexpensive configuration, which eliminates difficulties encountered with prior devices, achieves the objectives indicated and solves problems existing in the art.

In the foregoing description, certain terms have been used for brevity, clearness and understanding; but no necessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the periscope blackout blind construction is constructed and used, the characteristics of the construction, and the advantageous, new and useful results obtained; the new and useful structures, devices, elements, arrangements, parts, and combinations, are set forth in the appended claims.

I claim:
1. A periscope construction including:
 a. a transparent block having eyepiece and object viewing sections located at generally opposite ends of said block, said eyepiece section having a viewing surface and a reflective surface forming an included acute angle therebetween;
 b. a protective housing enclosing portions of the eyepiece viewing section, said housing having an opening aligned with the viewing surface and an angled rear wall spaced from and extending generally parallel with the reflective surface;
 c. guide means mounted between the housing and the transparent block, said guide means having a pair of spaced parallel channels with a first straight leg portion extending along edges of the housing opening, a second straight leg portion extending between the housing rear wall and the reflective sur- face of the block, and a curved portion integrally connecting said first and second straight leg portions and extending about the exterior of the angle formed by the viewing and reflective surfaces of the block; and d. flexible opaque sheet means slidingly mounted on and extending between the space channels, said sheet means being movable in the first straight leg portion across the housing opening between open and closed positions for exposing and covering the eyepiece viewing surface of the transparent block, and movable through the curved portion between the first and second straight leg portions.

2. The construction defined in claim 1 in which the sheet means of a polycarbonate film.

3. The construction defined in claim 1 in which the curved portion of the guide means channels has a radius of curvature in the range of ¼ inch to 1 ½ inches.

4. The construction defined in claim 1 in which the guide means inner and outer curved metal sheets, with one of said sheets having thickened side edges; and in which the thickened side edges lie in abutting relationship with the side edges of the other of said sheets to space said sheets from each other to form the channels therebetween.

5. The construction defined in claim 4 in which each of the curved metal sheets includes a cutout portion; and in which the cutout portions are aligned with each other and with the eyepiece viewing surface.

6. The construction defined in claim 4 in which the cutout portions form a pair of parallel end strips on each sheet; in which the thickened side edges of said one sheet form spaces between the end strips of the metal sheets; and in which said spaces provide the first straight leg channel portion of the guide means.

7. The construction defined in claim 6 in which the end strips of the inner sheet have greater lengths than the end strips of the outer sheet and form a pair of openings between the ends thereof; in which a reinforcing flange is mounted on one end of the sheet means; and in which the ends of said reinforcing flange align with the openings formed by the ends of the end strips when the sheet means is in closed position for removal of the sheet means from within the guide means.

8. The construction defined in claim 7 in which finger tab means are formed on the reinforcing flange of the sheet means.

9. A periscope construction including:

a. housing means having at least front and rear walls forming an acute included angle therebetween;

b. optical means mounted within the housing means having first and second reflective surfaces on opposite ends of the housing means for viewing a field from within a protective vehicle;

c. an eyepiece viewing opening formed in the front wall aligned with the first reflective surface, and defined by a pair of side edges and top and bottom edges;

d. guide means mounted within the housing means including a pair of spaced channel means extending along the rear wall and side edges of the front wall viewing opening, said channel means having a curved portion complementary with and extending about the included angle formed by the front and rear housing walls; and e. flexible opaque polycarbonate sheet means slidably mounted on and extending between the spaced channels and movable between open and closed position, with said sheet means covering the front wall viewing opening when in closed position preventing light from passing through the viewing opening and into the optical means.

10. The construction defined in claim 9 in which the front wall viewing opening has a generally rectangular shape and lies in a vertical plane; in which the rear wall has an inclined planar portion and a horizontal porton connecting said inclined planar portion with the fron wall; and in which the curved portions of the channels are located adjacent the horizontal rear wall portion.

11. The construction defined in claim 9 in which the guide means includes a pair of spaced metal sheets which are located adjacent to and extend along the rear wall of the housing; in which said metal sheets from a void therebetween which extends between and communicates wit the channel means; and in which the opaque sheet means is located within said void when in open position.

12. The construction defined in claim 9 in which the optical means includes a block of transparent plastic having eyepiece and object viewing sections formed at opposite ends of said block; and in which tthe eyepiece viewing section includes a vertically extending viewing surface aligned with the housing front wall opening; and in which the opaque sheet means covers said viewing surface when in closed position.

* * * * *

UNITED STATES PATENT AND TRADEMARK OFFICE
CERTIFICATE OF CORRECTION

PATENT NO. : 4,033,677
DATED : July 5, 1977
INVENTOR(S) : Gerald Tausch

It is certified that error appears in the above-identified patent and that said Letters Patent are hereby corrected as shown below:

Column 5, line 29, change "35" to - 25 -
Column 6, line 28, add the word - an - at end of line
Column 7, line 6, change "slidingly" to - slidably -
Column 7, line 12, add the word "curved" - channel - "portion"

Column 7, line 15, add the words "means" - is formed - "of"

Column 7, line 20, add the word "means" - includes - "inner"

Column 8, line 29, change "fron" to - front -
Column 8, line 35, change "from" to - form -
Column 8, line 37, change "wit" to - with -

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*